United States Patent [19]

Hjern et al.

[11] Patent Number: 5,873,033
[45] Date of Patent: Feb. 16, 1999

[54] METHOD AND ARRANGEMENT FOR TRANSFER BETWEEN A CORDLESS TELECOMMUNICATION SYSTEM AND A CELLULAR MOBILE TELECOMMUNICATION SYSTEM

[75] Inventors: Magnus Hjern, Smygehmamn; Peter Olanders, Lomma, both of Sweden

[73] Assignee: Telia AB, Farsta, Sweden

[21] Appl. No.: 596,007

[22] Filed: Feb. 6, 1996

[30] Foreign Application Priority Data

Feb. 6, 1995 [SE] Sweden .................................. 9500407

[51] Int. Cl.⁶ .................................................. H04Q 7/02
[52] U.S. Cl. .......................... 455/417; 455/417; 455/426; 455/44; 455/437
[58] Field of Search .................................... 455/417, 444, 455/426, 437, 436, 440, 433; 379/105, 101

[56] References Cited

U.S. PATENT DOCUMENTS

| 5,212,831 | 5/1993 | Chuang et al. | 455/450 |
| 5,260,988 | 11/1993 | Schellinger et al. | 455/552 |
| 5,291,544 | 3/1994 | Hecker | 455/436 |
| 5,311,571 | 5/1994 | Pickert | 455/436 |
| 5,428,663 | 6/1995 | Grimes et al. | 455/417 |
| 5,491,837 | 2/1996 | Haartsen | 455/437 |
| 5,499,387 | 3/1996 | Chamber | 455/437 |
| 5,533,099 | 7/1996 | Byrne | 455/444 |
| 5,669,061 | 9/1997 | Schipper | 455/440 |
| 5,734,984 | 3/1998 | Reece et al. | 455/437 |

FOREIGN PATENT DOCUMENTS

594354 A2 10/1897 European Pat. Off. ............... 379/105

Primary Examiner—Reinhard J. Eisenzopf
Assistant Examiner—Jean A. Gelin
Attorney, Agent, or Firm—Oblon, Spivak, McClelland, Maier & Neustadt, P.C.

[57] ABSTRACT

A method and arrangement for transfer between a cordless telecommunication system, preferably DECT, and a cellular mobile telecommunication system, preferably GSM. The cordless telecommunication system includes of a number of cells within a relatively small area, while the mobile telecommunication system includes of a number of cells within a relatively larger area which completely or partly overlaps the area of the cordless system. The system comprises at least one portable terminal capable of communicating with both the cordless and cellular communication systems. Accordingly a transfer zone is fixed by the cordless system and the terminal is monitored with regard to it identity and position so that transfer parameters can be transmitted to the terminal when it is located in the transfer zone. The transfer is prepared by setting up a three-party connection between the terminal and the telecommunication system and between the terminal and the mobile telecommunication system. The terminal disconnects the connection to the cordless telecommunication system and a transfer to the mobile system takes place. The method and arrangement reduce the transfer time between the different systems by transmitting transfer parameters to the portable terminal and setting up the preparatory three-party connection.

10 Claims, 4 Drawing Sheets

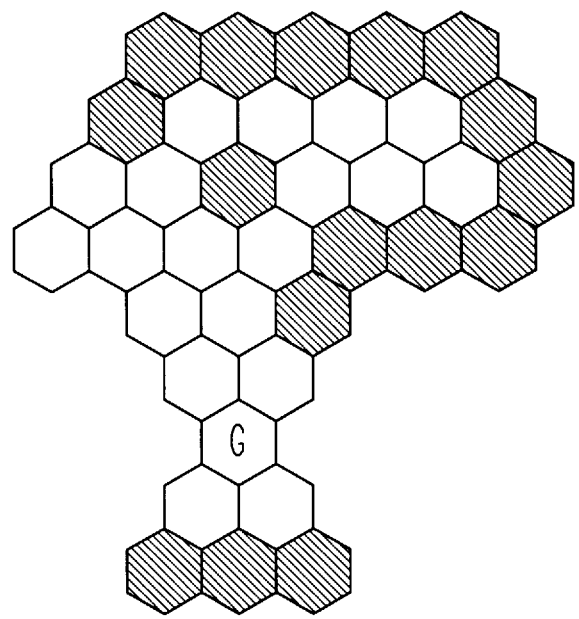
FIG. 3
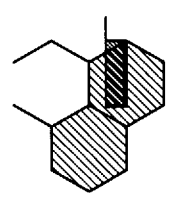 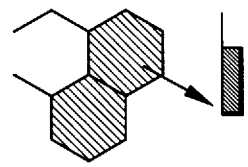 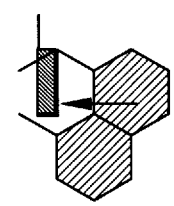
FIG. 4A  FIG. 4B  FIG. 4C

METHOD AND ARRANGEMENT FOR TRANSFER BETWEEN A CORDLESS TELECOMMUNICATION SYSTEM AND A CELLULAR MOBILE TELECOMMUNICATION SYSTEM

BACKGROUND OF THE INVENTION

1. Field of the Invention

The present invention relates to a method and an arrangement for transfer between a cordless telecommunication system, such as DECT, and a background cellular mobile telecommunication system such as GSM. The invention is in particular conceived to be used when different operators operate the two systems. In a case where both systems are operated by the same operator and the DECT system is connected directly to the background GSM network, transfer can be effected in a more effective manner.

Generally, the present invention reduces the transfer time between the different systems by among other things transmitting transfer parameters to the portable terminal and setting up a preparatory three-party connection.

2. Discussion of the Background

A user requirement of transfer is that the process is to be on the whole imperceptible for the user. That is to say, the transfer is to take place rapidly and without inconvenient background noise so that the transition which the transfer inevitably implies does not become annoying. It should therefore be possible to carry out the transfer in approximately 1 second, preferably even more rapidly. Within the field, there is a number of documents which describe different solutions to this problem.

U.S. Pat. No. 5,260,988, WO 93/16549, U.S. Pat. No. 5,127,042 and U.S. Pat. No. 4,989,230 describe communication systems which consist of both cordless telephony and a cellular mobile telephone system. The system includes portable cordless units which can initiate and receive calls in both the cordless and the cellular system. Calls can be connected automatically to the system in which the subscriber is located. There is also the possibility of automatically connecting a call in progress between the different systems if the subscriber moves between systems. It is possible for the user to select manually a given system by a button procedure, either permanently or at a given time. On transfer between the two systems, a three-party call is utilized.

U.S. Pat. No. 5,235,632 describes a mobile telephone system which consists of an external system which consists of base stations, divided into cells, with high transmitting power connected to a mobile telephone exchange and an indoor system consisting of base stations with low transmitting power connected to a mobile telephone exchange. According to the document, the possibility exists of connecting a call between the internal and the external system by, for example, measuring signal strength from each system.

U.S. Pat. No. 5,309,502 relates to a radio telephone which combines the function of a cordless telephone and a cellular mobile telephone. The possibility exists, on connecting calls, of automatically selecting via which the communication is to take place. Nothing is mentioned about transfer during calls in progress.

U.S. Pat. No. 5,210,785 relates to a cordless communication system and a terminal which combines two different systems such as cordless telephony and cellular mobile telephony. According to the document, selection of the communication method is to take place automatically.

U.S. Pat. No. 5,329,574 describes a method of continuously maintaining telephone communication when a radio communication unit moves between two different communication systems. When the unit discovers that the communication quality is deteriorating in a first system, a connection packet is transmitted via a central control unit to a second system. The communication in the first system is maintained until the second system confirms it has taken over of the communication.

U.S. Pat. No. 5,212,684 relates to a communication system which utilizes portable radio telephones. The system consists of base stations and portable telephone units in accordance with the GSM standard. The portable telephone units can also work in accordance with the DECT standard. The system carries out both internal and external transfer but does not mention transfer between DECT and GSM.

WO91/16772 describes a method of transfer in a mobile radio communication system. According to the document, the mobile measures signal strengths of surrounding base stations. When the transfer is felt to be justified, the signal strength vectors are correlated with stored vectors and, if there is correlation, transfer takes place in a manner which depends on the position.

EP A1 615 392 describes a further example of transfer in a mobile radio system which utilizes the position of the mobile.

U.S. Pat. No. 5,345,499 relates to a method of transfer in a cellular radio system. The system consists of microcells and macrocells. In the system, the possibility exists of making connection and transfer dependent on the speed of the mobile. Thus, a mobile with a high speed can be prevented from connecting itself to a microcell if it exceeds a given threshold speed.

U.S. Pat. No. 5,276,906 shows a cellular radio telephone system which has two threshold levels for transfer. When the signal strength in a first cell falls below a first threshold value, transfer is initiated to a second cell by this cell being selected with the aid of the mobile. When the signal strength in the first cell then falls below a second threshold value, transfer to the second cell is carried out.

SUMMARY OF THE INVENTION

There is a requirement to carry out transfer between cordless systems, in particular DECT, and cellular communication systems, in particular GSM, in a more rapid manner than that which is achieved in the prior art. Three-party calls alone, which form part of the state of the art and this invention, are thus not adequate. According to the invention, the problem is solved by continuously monitoring the position and identity of the terminal and, where appropriate also transferring to be terminal, and relevant time and transfer parameters being. Thus, a three-party connection can be set up and the terminal can register itself in the mobile telephone exchange for rapid connection, after obtaining an acknowledgement from the mobile system.

The present invention provides method of transfer between a cordless telecommunication system which includes a number of cells within a relatively small area and a cellular mobile telecommunication system which includes a number of cells within a relatively larger area which completely or partly overlaps the area of the cordless system. The system comprises at least one portable terminal with the capacity of communicating with both communication systems.

According to the invention, a transfer zone is fixed by the cordless system and the terminal is monitored with regard to its identity and position so that transfer parameters can be transmitted to the terminal when it is located in the transfer zone. The transfer is prepared by setting up a three-party connection between the terminal and the cordless system and between the terminal and the mobile system. The terminal disconnects the connection to the cordless system and transfer to the mobile system takes place.

Preferably, the three-party connection is set up by a mobile telephone exchange in the mobile system and this is kept in waiting state until the terminal has registered itself with the mobile system and received acknowledgement that transfer can take place.

The transfer can be induced by the terminal or a fixed station of the cordless system.

The invention also relates to an arrangement for implementing the method.

BRIEF DESCRIPTION OF THE DRAWINGS

The invention is explained below in detail with reference to accompanying drawings, in which FIG. 3 shows diagrammatically a coverage area in a DECT system, FIG. 4A–4C show diagrammatically different transfer situations according to the invention.

DETAILED DESCRIPTION OF PREFERRED EMBODIMENTS

As an aid to clearer understanding of the invention, a brief description is first given of the cordless communication system in which the present invention is first and foremost conceived for use.

Digital European Cordless Telecommunications, DECT, is a system which has been specified within ETSI for cordless telecommunication with a number of application areas, for public applications, for private use within e.g. company systems or for home use, and for radio-based connection to the local network. Although DECT has great similarities with the traditional mobile telephony systems, the basic standard lacks a description of the functionality of the network. For this purpose, special access profiles are instead specified, which describe the connection to and the interaction with the background network elements.

For interaction with GSM (Global System for Mobile communication), work is going on with such a profile, DECT/GSM Interworking Profile. The standards in this profile describe how functions and messages in GSM are to be capable of being transmitted over a DECT radio system. Handover or transfer between DECT and GSM is as yet not described in any of the standards which form part of the profile.

DECT is a very flexible standard which combines (1) high system capacity within traffic-intensive areas (2) good quality for both speech and data services. The limited radio coverage of the system, however, results in the DECT system being very local and DECT will hardly be extended to cover as large an area as a mobile telephony network does. DECT systems will probably come to be connected directly to GSM networks, but also to exist as free-standing systems, e.g., in direct connection with subscriber exchanges.

Handover within DECT is normally initiated by the terminal, either because the radio channel is subject to interference, or for reasons of coverage. Such internal handover within a DECT cluster is conducted entirely within the framework of the local DECT system and requires no interaction with background network elements. Transfer to another cluster or to another access system, e.g. to GSM, is called external handover and can be decided either by the terminal or by the central unit of the cluster.

Figure 1:
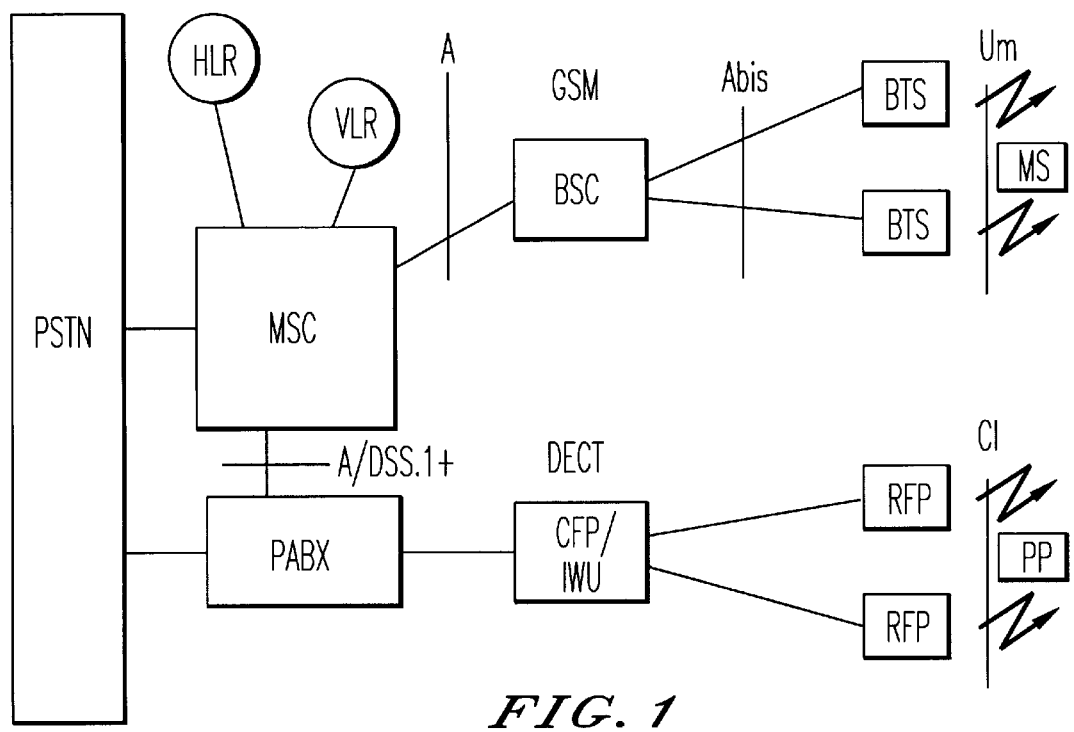
FIG. 1 is a block diagram of an example of system architecture according to the present invention.

In FIG. 1, an example of a system architecture according to the invention is shown. The fixed side of DECT can be divided into one or more radio units (Radio Fixed Parts) RFP and a central unit (Central Fixed Part) CFP. Together, they form a fixed unit (Fixed Part) FP. Radio units RFP connected to a common central unit constitute a so-called "cluster" and serve all the portables, PP, within a coverage area via the radio interface CI of the DECT system. CFP can for example be a part integrated in a PABX subscriber exchange, or constitute a part of the local station. The DECT system can thus be owned and/or managed either by a public telecommunications operator or a private operator.

The mobile cellular side, that is to say the GSM part, is constituted by a mobile telephone exchange MSC (Mobile Switching Center), a base station control unit (Base Station Controller) and base stations BTS (Base Transceiver Station). The GSM system communicates with its mobiles MS via its radio interface Um.

Both the DECT system and the GSM system are connected to the public telecommunication network PSTN.

Local databases like home location register (HLR) and visitor's location register (HLR) can also be connected to the CFP of the system or, like in the GSM case, supported by functions in the background network.

A DECT terminal, or portable PP, needs to be capable of handling the identity structure of GSM in order to be capable of being connected into the combined DECT/GSM environment. There are also requirements as far as security routines are concerned, e.g. authentication and ciphering of user data.

Figure 2:
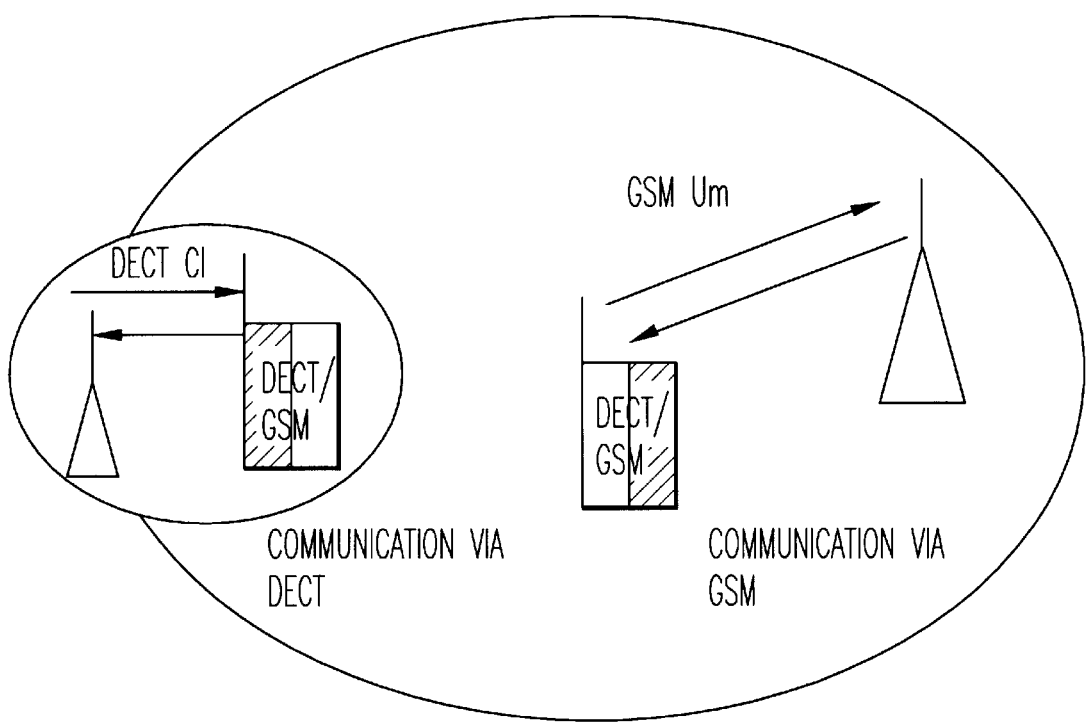
FIG. 2 is a diagram of an alternative use of a terminal in the DECT system or GSM system.

The user sees great value in only needing to use one terminal for his communication. Combined hand units for DECT and GSM, so-called dual mode terminals (FIG. 2), are therefore an essential component in integration of systems.

With a combined DECT/GSM terminal, it is natural that requirements will also arise for the communication to be capable of being maintained during a transition between the two different access systems, if they are used in the same geographical area. A transfer of calls in progress from DECT to GSM, that is to say a handover, is, as pointed out previously, not as yet described in any of the standards which relate to interaction between systems.

Handover is a very important function in order to be capable of offering users complete mobility over a number of application areas. It is of primary interest to find a solution for handover from DECT to GSM since the GSM access system can then function as an extension and support for DECT even if systems are operated by different operators.

There are many technical problems for operator-independent handover from DECT to GSM:

1) A DECT coverage area which lies "embedded" in a background GSM can utilize the mobility functions of GSM in order to effect handover between systems. The background systems must, however, be capable of communicating with one another (see FIG. 1), exchanging system information and also transmitting such information to the terminal.
2) A GSM handover in the traditional sense presupposes that the mobile station assists the network with measuring data about the radio environment. Handover in DECT has an entirely different functionality than in GSM. Therefore, the traditional handover methods which exist in DECT or GSM cannot be utilized for a transfer between systems.
3) Handover must not be a slow process. From DECT to GSM, it may be acceptable that handover is perceptible, but time requirements are still high. The users can be assumed to require that handover takes place with an interruption in the call of less than 1 second. When systems are operated by different operators, the fixed system parts must therefore prepare any coming handover in advance.
4) Necessary signaling should for two reason, be minimized.
5) In order to maintain a high connection quality, unnecessary transfers are to be avoided, that is to say handover to a GSM cell take place only when DECT coverage is lacking, or for other operator-dependent reasons.
6) Added to this is the further condition that the solution for handover is to be capable of being implemented at a reasonably low cost and without requiring comprehensive revisions of the software in terminals.
7) The DECT operator (owner, manager) will probably also want to be capable of controlling conditions for handover, e.g. where, when and to whom this service is to be available.

The present application describes how handover can be carried out from DECT to GSM, where it is not necessary that both access systems are operated by the same operator, but where they are in one manner or another connected to the same background mobile telephone exchange, MSC. The signaling interface is to have the possibility of transmitting mobility information which in GSM, is defined in the Mobile Application Part, MAP. This can take place either via the A-interface of GSM or via a future ISDN-based interface, e.g. DSS.1+ (see FIG. 1).

The solution is based on the following basic parts:
a) Control over conditions for handover In FIG. 3, an example is shown of an area which has DECT coverage. In FIG. 3, the GSM coverage is not marked, but it is intended to exist over the entire area, possibly with the exception of some indoor cells. Marked cells are intended to provide the possibility of handover to GSM. Area P relates to an internal DECT area where handover to GSM is also possible (e.g., a parking place). Area G is an external edge area, in which the DECT operator will not allow a handover from DECT to GSM (e.g., an area such as a tunnel).

The DECT operator controls conditions for handover by defining, in its central unit CFP, the cells from which handover is allowed, and the cells from which handover is not allowed. The conditions for handover from DECT to GSM which are mentioned here can also be extended to include time spaces and also individual-related conditions. A further possibility, which also forms part of the invention, is that the central unit is programmed in order to adaptively change its conditions within the limits set by the operator. This adaptivity is based on available statistics in the central unit, where information is gathered about when and where DECT portables request (external) handover. The central unit is programmed to follow the path of each DECT portable through the cells of the cluster and analyze/calculate which "paths" lead to the request for external handover. The central unit "instructs" itself in this manner to predict, starting from a movement pattern of a DECT portable, where and when the latter will request external handover, thus can prepare a handover to a GSM system in very good time.

An example can demonstrate this.

Statistics in the central unit will show a relatively large number of requests for external handover at the end of work time (e.g., 1630 hours) from mobiles which a short time before were in the parking area (P in FIG. 3).

One of the major properties of DECT is the possibility of a single terminal simultaneously utilizing a number of different subscriptions/identities and, from the fixed unit FP, indicating which type of access rights belong together with these identities. In the case of DECT/GSM, this can be solved with the aid of a so-called multi-application card. The equivalent of DECT to the SIM card (Subscriber Identity Module) of GSM is the DECT Authentication Module. The functionality of this DAM card is standardized and will be capable of supporting requirements for the identities and the security which applies for the SIM card of GSM.

This means that the DECT/GSM dual mode terminal has the possibility of storing a number of sets of system parameters independently of one another and interpreting changes in these parameters. If the portable is provided with the parameters from the fixed side as is required on new registration in a new search area in a new system, this information can be utilized in order to activate external handover to this system. This functionality is a part of the invention and is used in order to reduce the set-up time on handover from DECT to GSM to an acceptable level (<approx. 1 sec.).

Figure 5:
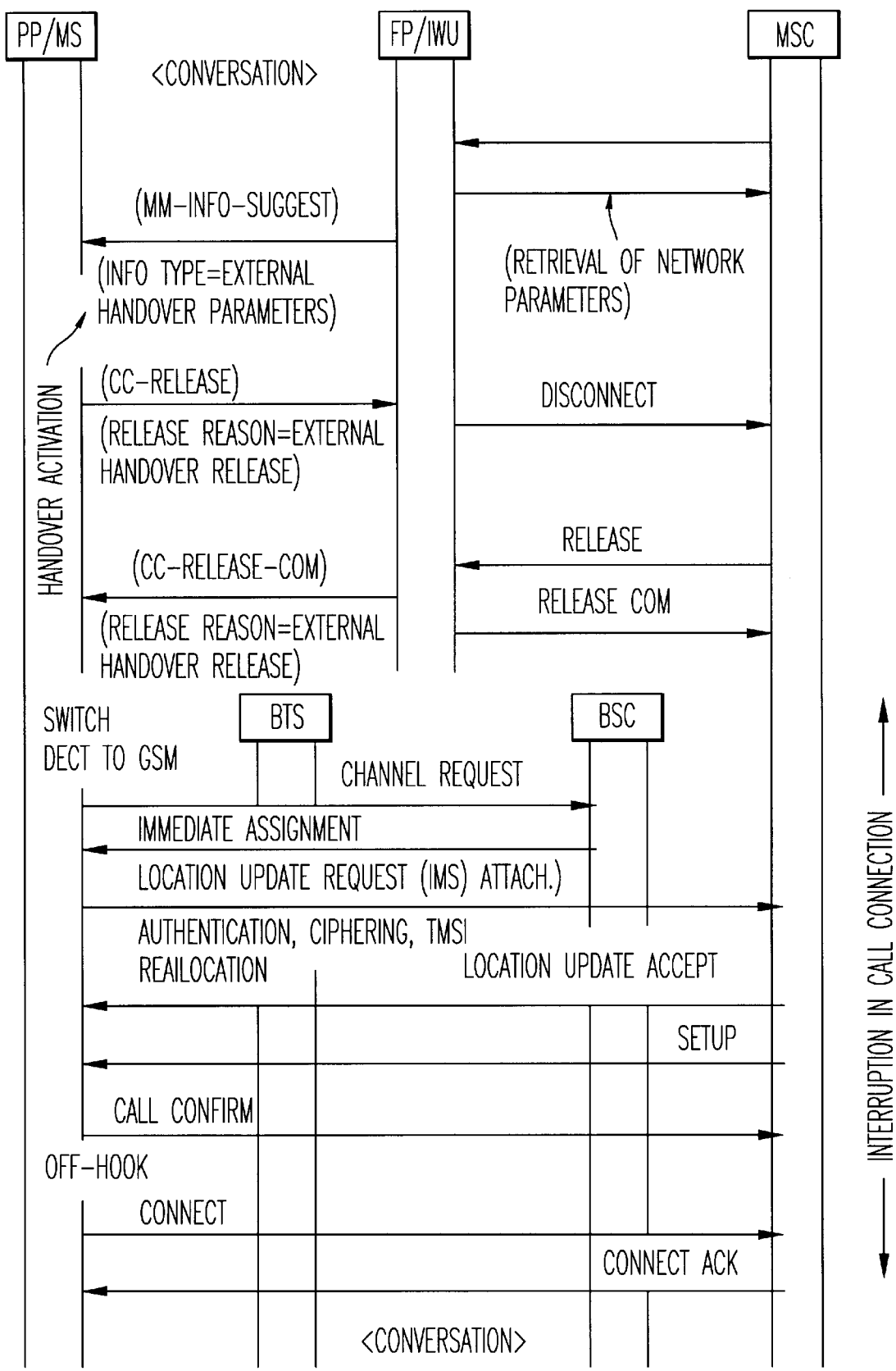
FIG. 5 is a time diagram of signaling between the terminal and systems of terminal-initiated transfer from a DECT system to GSM system.

In this manner, the handover zone is not only a geographical area but also related to time, movement patterns and—even—the user (identity).
b) Preparation for handover When the terminal is located in the handover zone during a call in progress, a handover is prepared by the system providing the terminal with necessary parameters so that, without delay, it is to be capable of establishing contact with a corresponding base station BTS in the GSM system, and a three-party connection is set up in the network between the DECT terminal in progress and a "waiting" connection in the GSM system.
c) Activation of handover Handover can, as previously mentioned, be activated either from the terminal or from the fixed side of DECT. In FIG. 5, the message flow on handover activated by the terminal is shown. The terminal-controlled handover is usually activated because the field strength of the DECT connection has become so low that a call connection can no longer be maintained with sufficient quality. After acknowledgement has been received from the network, the connection to the DECT system is subsequently interrupted and the portable registers itself promptly in relation to the corresponding base station in the GSM system, whereupon the call can be set up once more via the waiting three-party connection.

Figure 6:
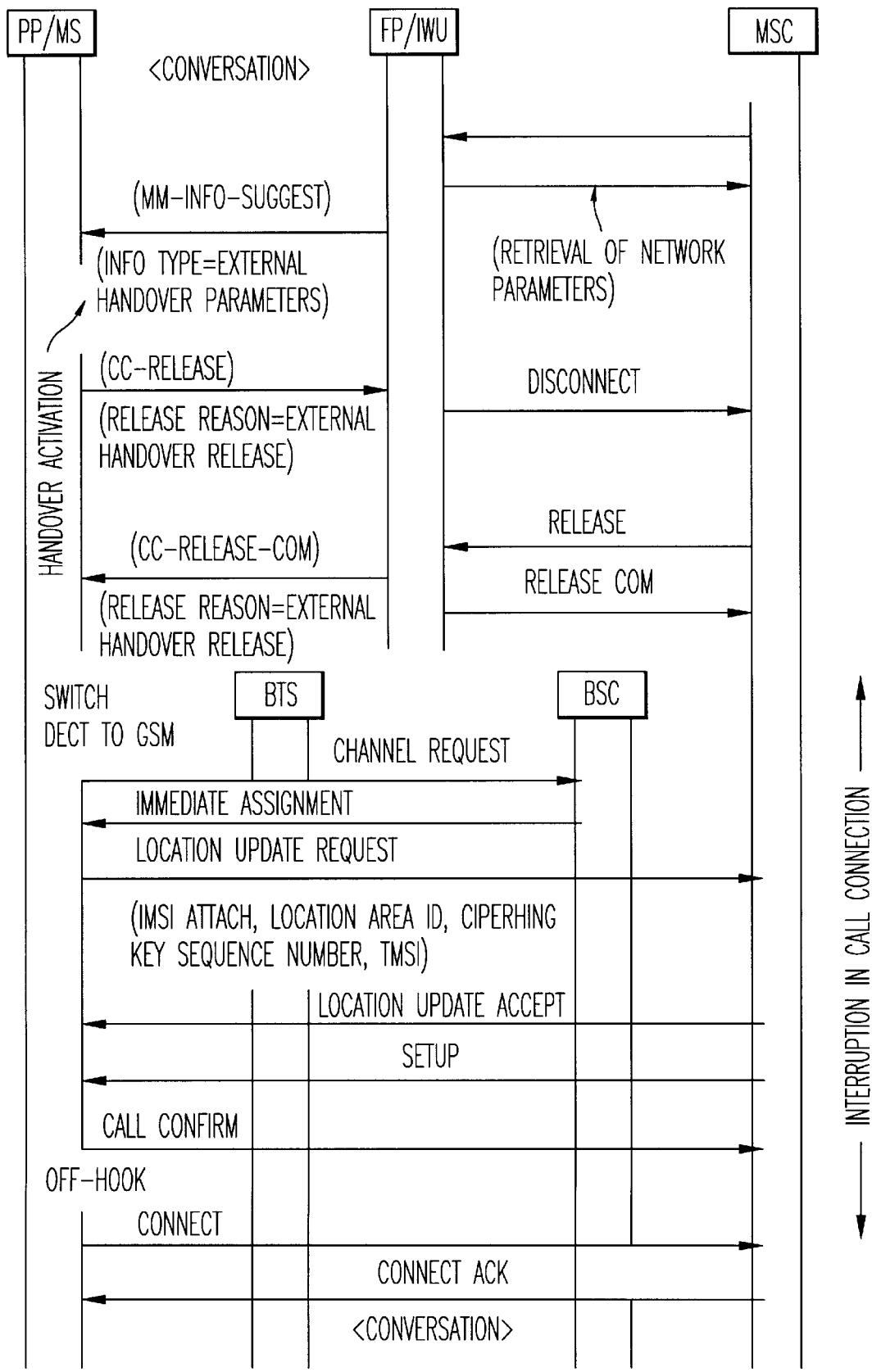
FIG. 6 is a time diagram corresponding to FIG. 5 which shows transfer initiated by the fixed side in the DECT system.

The solution which is described in this application can, however, just as readily be activated from the central unit CFP in the event that the analysis is carried out based on information such as the geographical positioning of the terminal, time, earlier request for handover, etc. FIG. 6 shows messages in the event of a CFP-controlled handover. Which system part activates the handover has no influence on the complexity of the terminal. In the same system, handover can be activated by either party. Selection is dependent on e.g. the functionality which is programmed into the adaptive handover algorithm of the central unit CFP.

d) Termination of handover

If handover is prepared, but does not need to be brought about, the waiting three-party connection in GSM is terminated, as it is no longer required.

The transfer procedure is described in greater detail below.

A terminal which during a call in progress communicates via marked base stations in FIG. 3, is located within geographically and empirically obtained specific areas which are identified as handover zones.

The central unit CFP in DECT carries on the whole time analysis of calls in progress and, on the basis of the logical information which is built up, draws a conclusion about whether handover for this terminal is appropriate. The central unit CFP then collects, via the mobile telephone exchange MSC in GSM, system parameters from the network. CFP transmits this information to the terminal with the aid of the DECT procedure for parameter collection (see FIG. 5). The information which is collected from the GSM network and is transmitted to the terminal contains the radio frequency and the identity of the base station, GSM BTS, to which the terminal is to be connected. The terminal receives and stores the parameters together with a request from CFP that these are to be used for a handover from DECT to GSM. In the mobile telephone exchange MSC in GSM, a three-party connection is established from the usual-service range.

This is put into waiting state in order to be activated only when the terminal has registered itself in relation to the base station in question BTS in GSM.

It is worth noting that CFP-controlled handover can make possible further reductions in of the transfer time. A DECT system with a high functional level has an even greater possibility of preparing a handover. In this case (see also FIG. 6), further information can be transmitted to the terminal in the form of a ciphering code, search area and paging identity.

Transfer between systems can then take place, but bringing about of the prepared handover is carried out by the terminal or the central unit at a later stage. In the continued description below, the situation is shown, for the sake of simplicity, when the terminal activates a handover.

In this example, a handover initiated by the terminal is described, as it is the latter which has knowledge about the radio conditions, but the function can, as mentioned previously, just as well be initiated by the fixed side.

After a handover decision on handover, the terminal sends a message that the call in progress link is to be disconnected because of an external handover (see FIG. 5). The terminal remains connected, however, until a positive acknowledgement has been received from the network that transfer can take place. Subsequently, the call is interrupted temporarily and the terminal functionally switches off its DECT radio communication. The connection to the other party is maintained by the three-party connection established in advance, which is now in the waiting state.

Immediately afterwards, the GSM part in the terminal is activated and the communication with the GSM system set up. As information has already been transmitted from the network at an earlier stage, this registration takes place with the aid of the procedure for IMSI Attach which saves time and limits the signaling both over the radio route and in background network elements. The terminal can establish contact directly with the designated base station BTS on the control channel of the latter. On registration, the GSM identity of the terminal is used, which is assumed to be stored as a part of the active card DAM.

After registration, the mobile telephone exchange MSC once again established contact with the terminal by means of a normal mobile-terminated call connection. The terminal answers automatically the awaited call, which reduces the interruption time and makes the handover less perceptible for the user. Automatic answering (off-hook) requires no more extensive intelligence in the terminal, and today already exists in some GSM products.

The awaited connection is connected once again and the call between the parties can continue.

A prepared handover can be interrupted for a number of reasons. The terminal may e.g. via internal handover have exchanged a base station within the DECT system for a radio unit RFP which lies "deeper" in the DECT cluster than the defined handover zone. The fixed side receives information about this and can then terminate the waiting three-party connection in GSM. The call can continue to be served with DECT access without further measures needing to be taken.

Handover can also be interrupted for operator reasons, by the terminal not being provided with necessary GSM parameters, or by negative acknowledgement being given on disconnection of the call link. The terminal should in this case not interrupt the call in progress, but maintain the connection via DECT as long as this is possible.

The invention can be utilized within all application environments of DECT where there is a requirements for calls to be maintained across the boundaries when the radio coverage of DECT passes into GSM. For the user, this functionality is very important for the qualitative experience of the service, and for the operator a fully covering service is obtained which is a competitive advantage in relation to competitors on the market.

Thus, the present invention solves problems of transfer between a cordless communication systems and a cellular mobile communication system in an effective manner. The invention can be implemented with the protocols and functions which are available according to standards for DECT/GSM IWP and the protocols and network functions which are built into local exchanges, company systems and the GSM network. An expert in the field will understand easily how the invention is to be implemented in detail, which in itself can be effected in various ways. The invention is limited only by the patent claims below.

We claim:

1. A method of transfer between a cordless telecommunication system (DECT) including a number of cells within a relatively small first area and a cellular mobile telecommunication system (GSM) including a number of cells within a relatively larger second area which completely or partly overlaps the first area of the cordless telecommunication system (DECT), and including at least one portable terminal (PP) capable of communicating with the cordless and cellular communication systems, the method comprising the steps of:

designating a transfer zone for the cordless telecommunication system (DECT), monitoring the at least one portable terminal (PP) with regard to identity and position, determining a designated time-of-day at which the at least one portable terminal (PP) has previously transferred a call due to movement of the at least one portable terminal (PP);

transmitting transfer parameters to the at least one portable terminal (PP), when the at least one portable terminal (PP) is located in the transfer zone, preparing a transfer in advance by setting up at approximately the designated time-of-day a three-party connection between the at least one portable terminal (PP) and the cordless telecommunication system (DECT) and between the at least one portable terminal (PP) and the mobile telecommunication system (GSM) based on the position of the at least one portable terminal (PP) when the at least one portable terminal (PP) previously transferred a call due to movement;

disconnecting the at least one portable terminal (PP) from a connection to the cordless telecommunication system (DECT), and transferring communication to between the at least one portable terminal (PP) and the mobile telecommunication system (GSM).

2. Method according to claim 1, wherein the step of preparing comprises:

setting up the three-party connection by a mobile telephone exchange (MSC) in the mobile system (GSM), and keeping the three-party connection in a waiting state until the at least one portable terminal (PP) has registered itself with the mobile telecommunication system (GSM) and received an acknowledgement that transfer can take place.

3. Method according to claim 1, wherein the step of transferring comprises initiating transfer by the at least one portable terminal (PP).

4. Method according to claim 1, wherein the step of transferring comprises initiating transfer by a fixed station (CFP) of the cordless telecommunication system (DECT).

5. The method according to claim 1,
wherein the step of designating the transfer zone comprises designating the transfer zone in a time-dependent format.

6. Method according to claim 1, wherein the step of transferring comprises interrupting transferring and disconnecting any three-party connection already prepared when the at least one portable terminal (PP) carries out internal transfer to another call in the cordless telecommunication system (DECT) which does not belong to the transfer zone.

7. Method according to claim 1, wherein the step of transferring comprises interrupting transferring when the at least one portable terminal receives a negative acknowledgement from the mobile telecommunication system (GSM).

8. An arrangement for transfer between a cordless telecommunication system (DECT) which includes a number of cells within a relatively small first area and a cellular mobile telecommunication system (GSM) which includes a number of cells within a relatively larger second area which completely or partly overlaps the first area of the cordless telecommunication system (DECT), and including at least one portable terminal (PP) capable of communicating with the cordless and cellular communication systems, comprising:

a central unit (CFP) in the cordless telecommunication system (DECT) including means for designating a transfer zone including cells in the cordless telecommunication system from which transfer is allowed, and means for monitoring the at least one portable terminal (PP) with regard to identity and position, the means for monitoring including means for determining a designated time-of-day at which the at least one portable terminal (PP) has previously transferred a call based on movement of the at least one portable terminal (PP):

storage members in the at least one portable terminal (PP) for storing transfer parameters which are transmitted to the at least one portable terminal when the at least one portable terminal is located in the transfer zone;

means, in the mobile telecommunication system (GSM), for setting up in advance a three-party connection, at approximately the designated time-of-day between the at least one portable terminal (PP) and the cordless telecommunication system (DECT) and between the at least one portable terminal (PP) and the mobile telecommunication system (GSM), based on the position of the at least one portable terminal (PP) when the at least one portable terminal (PP) previously transferred a call due to movement, and means, in the at least one portable terminal (PP), for disconnecting from the cordless telecommunication system (DECT) and transferring communication to the mobile telecommunication system (GSM).

9. Arrangement according to claim 8, wherein the storage members comprise respective active cards (DAM).

10. Arrangement according to claim 8, wherein the means for setting up comprises a mobile telephone exchange (MSC) including a number which sets up the three-party connection.

* * * * *